(12) United States Patent
Coors et al.

(10) Patent No.: US 9,897,255 B2
(45) Date of Patent: Feb. 20, 2018

(54) PRESSURE VESSEL WITH PCM AND METHOD OF USE

(71) Applicants: Andrew Coors, Morrison, CO (US); Kaushik Mallick, Thornton, CO (US); John Cronin, Denver, CO (US); Michael W. Stewart, Wheat Ridge, CO (US)

(72) Inventors: Andrew Coors, Morrison, CO (US); Kaushik Mallick, Thornton, CO (US); John Cronin, Denver, CO (US); Michael W. Stewart, Wheat Ridge, CO (US)

(73) Assignee: Steelhead Composites, LLC, Golden, CO (US)

( * ) Notice: Subject to any disclaimer, the term of this patent is extended or adjusted under 35 U.S.C. 154(b) by 516 days.

(21) Appl. No.: 14/515,582

(22) Filed: Oct. 16, 2014

(65) Prior Publication Data

US 2016/0109065 A1    Apr. 21, 2016

(51) Int. Cl.
  *F17C 1/00*    (2006.01)

(52) U.S. Cl.
  CPC ........ *F17C 1/00* (2013.01); *F17C 2201/0104* (2013.01); *F17C 2201/056* (2013.01); *F17C 2203/0604* (2013.01); *F17C 2203/068* (2013.01); *F17C 2203/0619* (2013.01); *F17C 2203/0621* (2013.01); *F17C 2203/0636* (2013.01); *F17C 2203/0663* (2013.01); *F17C 2221/012* (2013.01); *F17C 2221/033* (2013.01); *F17C 2223/0123* (2013.01); *F17C 2223/036* (2013.01); *F17C 2260/025* (2013.01); *F17C 2270/0168* (2013.01); *Y02E 60/321* (2013.01)

(58) Field of Classification Search
  CPC .... F17C 1/005; F17C 1/10; F17C 1/12; F17C 1/16; F17C 1/00; F17C 13/002; Y02E 60/321
  USPC ...... 220/588, 586, 581, 62.22, 62.19, 62.11; 206/0.6; 427/181, 180
  See application file for complete search history.

(56) References Cited

U.S. PATENT DOCUMENTS

| 4,581,285 | A | * | 4/1986 | Mahefkey, Jr. | ......... B32B 15/08 220/592.21 |
| 5,851,338 | A | * | 12/1998 | Pushaw | .................... B32B 5/18 156/278 |
| 8,662,343 | B1 | * | 3/2014 | Coors | ....................... F17C 1/12 206/0.6 |
| 2004/0040969 | A1 | | 3/2004 | DeLay et al. | |

(Continued)

OTHER PUBLICATIONS

E. Shipley, "Study of Natural Gas Vehicles (NGV) During the Fast Fill Process", Ph. D. Thesis, 2002, West Virginia University.

(Continued)

*Primary Examiner* — Robert J Hicks
(74) *Attorney, Agent, or Firm* — Don D. Cha; Hamilton DeSanctis & Cha, LLP

(57) ABSTRACT

The present invention provides a metal-lined composite gas storage device comprising a phase-change material coated on the exterior surface of a metallic liner. The presence of the phase-change material on the exterior surface of the metal liner reduces the temperature change within the interior of the metal liner during a gas filling process compared to a similar vessel that does not have a phase-change material coating, thereby allowing a significantly greater amount of gas to be filled at a given pressure.

17 Claims, 4 Drawing Sheets

(56) References Cited

U.S. PATENT DOCUMENTS

2011/0185764 A1     8/2011   Kelly
2012/0225290 A1     9/2012   Hartmann et al.

OTHER PUBLICATIONS

M. Farzaneh-Gord, "Real and Ideal Gas Thermodynamic analysis of Single Reservoir Filling Process of Natural Gas Vehicle Cylinders", J. of Theoretical and Applied Mechanics, Sofia, 2001, vol. 41, No. 2, pp. 21-36.
D. Horning, "Natural Gas Solutions for Transportation", Dec. 7, 2012.
http://www.outlast.com/, printed Apr. 15, 2013.
Y. Takagi et al., "Transport Phenomena during the Fast Filling Process in a Hydrogen Tank for the Fuel Cell Vehicle", J. of Advanced Research in Physics, Jul. 2011.
K. J. Kountz, Modeling the fast fill process in natural gas vehicle storage cylinders, presented at: 207th ASC National Meeting-Division of Fuel Chemistry, San Diego (1994), pp. 462-469.
ISO 11439:2000 International Standard, "Gas cylinders—High pressure cylinders for the onboard storage of natural gas as a fuel for automotive vehicles", Sep. 15, 2000.
M. Trugeon, "An Overview of NGV Cylinder Safety Standards, Production and In-Service Requirements", Jul. 2005.
R. Hirotani et al., "Thermal Behavior in Hydrogen Storage Tank for Fuel Cell Vehicle on Fast Filling", WHEC 16 / Jun. 13-16, 2006—Lyon France.
David Hirschi, "Understanding Differences between Thermal Interface Materials: Improve your ability to specify the optimum TIM", Dow Corning Case Study, 2008, Dow Corning Corp.
Pasupathy and R. Velraj, "Phase Change Material Based Thermal Storage for Energy Conservation in Building Architecture", International Energy Journal: vol. 7, No. 2, Jun. 2006.
A. Sharma, V. V. Tyagi, C. R. Chen and D. Buddhi, "Review on thermal energy storage with phase change materials and application", Renewable and Sustainable Energy Reviews, 2009, vol. 13, Issue 2, pp. 318-345.
L. G. Socaciu, "Thermal Energy Storage with Phase Change Materials", Leonardo Electronic Journal of Practices and Technologies, Issue 20, Jan.-Jun. 2012, pp. 75-98.
http://www.gizmag.com/phase-change-cup-coffee/12596/, printed Apr. 15, 2013.
http://www.micronal.de/portal/basf/ien/dt.jsp?setCursor=1_290814, printed Apr. 15, 2013.
http://en.wikipedia.org/wiki/Rotational_molding, printed Apr. 15, 2013.
http://www.engineershandbook.com/MfgMethods/blowmolding.htm, printed Apr. 15, 2013.
http://www.compositesworld.com/articles/next-generation-pressure-vessels, printed Apr. 15, 2013.
http://lightsailenergy.com/index.html, printed Apr. 15, 2013.
Office Action dated Aug. 26, 2014 of U.S. Appl. No. 14/166,839.
Office Action dated Feb. 2, 2015 of U.S. Appl. No. 14/166,839.
Office Action dated Sep. 10, 2013 of U.S. Appl. No. 13/861,909.

\* cited by examiner

PRESSURE VESSEL WITH PCM AND METHOD OF USE

FIELD OF THE INVENTION

The present invention relates to a metal-lined composite gas storage device comprising a phase-change material ("PCM") coated in between a metallic liner of the gas storage device and the composite material. The presence of the phase-change material reduces the temperature change within the interior of the metallic liner during a gas filling process compared to a similar vessel that does not have a phase-change material coating, thereby allowing a significantly greater amount of gas to be filled at a given pressure.

BACKGROUND OF THE INVENTION

Recently, there has been a significant increase in alternative fuel vehicles including those that use compressed natural gas (CNG) or gaseous hydrogen ($H_2$) as a fuel source. However, unlike liquid fuel, which consistently occupies about the same volume of fuel across a broad range of conditions, the amount of gaseous fuel inside a storage vessel depends on the pressure and temperature of the gas. The problem of "under-filling" is a phenomenon whereby a vessel is filled with a less-than-desired amount of gaseous fuel. Typically, during a gas-filling process, the gas temperature rises. This temperature rise reduces the density of the gas and packs fewer gas molecules in the vessel than what would be possible had the temperature remained constant. As the temperature of the gas in the cylinder equilibrates with the environment after the filling process is complete, the user ends up with less amount of gas in the vessel than what the rated pressure and initial temperature at steady-state conditions would have allowed. This essentially results in an under-filled vessel relative to its rated specification.

Under-filling of gaseous fuel during a filling process causes reduced driving range of vehicles that use CNG, $H_2$ or any other suitable gas as a fuel. Typically, compensation for the temperature rise is accomplished in the fuelling station dispenser by transiently over-pressurizing the vessel. The amount of over-pressurization is dictated by the capabilities of the filling station, the pressure differential between the dispenser of the filling station and the vessel, the ambient temperature and the design capacity of the vessel to handle pressures higher than its rated designation. This over-pressurization of a fuel storage vessel can be extremely dangerous if the vessels are not designed adequately and can reduce the cycle life of the vessel significantly. Currently there are no means to compensate for the under-filling problem by thermal management of the heat generated during the filling process in-situ of the vessel.

Methods or devices available that can reduce the amount of temperature increase during a gas-fill process, in particular during a fast-fill process, are limited to active cooling or refrigeration of the gas at the filling port. This process is energy intensive, requires expensive equipment and adds additional cost to the filling process and consequently the fuel filled. With an increase in alternative fuel vehicles that use CNG or hydrogen as a fuel source, there is an increasing need for enabling the fast-filling process without a significant increase in temperature, and/or a need for over-pressurization or active refrigeration of the filling gas.

SUMMARY OF THE INVENTION

Some aspects of the invention alleviate the problem of under-filling by providing a gas storage device that can reduce the amount of heat energy generated during a gas-filling process rather than simply relying on over-pressurizing the vessel. In particular, the gas storage device of the invention is designed to absorb heat energy generated during a gas-filling process by utilizing a phase-change material (PCM). The use of PCM reduces the temperature increase in the gas and minimizes or eliminates reduction of the gas density during a gas-fill process. The process of heat energy absorption by PCM is transparent to the filling process and the operation of the filling station.

Some aspects of the invention provides a device and a method for reducing the amount of temperature increase in a gas storage device during a gas-filling process, in particular during a fast-filling process. As used herein, the term "fast-filling process" refers to filling a gas storage device (e.g., 20 gasoline gallon equivalent gas storage device of a natural gas vehicle, i.e., NGV) within 10 minutes or less and typically within 5 minutes or less. It should be appreciated that as the gas storage device becomes filled with gas, its rate of filling decreases.

One particular aspect of the invention provides a device comprising a vessel capable of storing gas under pressure. The vessel includes an orifice that can be used to fill the vessel with gas. The vessel also includes an inner surface that comprises a phase-change material. The presence of a phase-change material in the inner surface of the vessel reduces the temperature change within the interior of the vessel during a gas-filling process. Typically, the phase-change material significantly reduces the amount of temperature increase compared to a similar gas storage vessel that does not have the phase-change material but is otherwise made of the same material. Typically, the PCM comprises a material that melts (i.e., changes phase) from solid to liquid at a certain temperature. The useful PCMs of the invention have a melting point in the range of from about 0° C. to about 80° C., typically from about 20° C. to about 50° C.

Other aspects of the invention provide a method for increasing the amount of gas filled in a vessel during a gas-filling process. The method generally comprises of providing a phase-change material on an inner surface of the gas storage vessel. The presence of phase-change material on an inner surface of the vessel substantially reduces the temperature, and thereby pressure, increase during a gas filling process compared to a similar gas storage vessel that does not have a PCM. This reduction in the amount of temperature and pressure increase allows the vessel to be filled with a greater amount of gas compared to a similar vessel that does not have a phase-change material.

In some embodiments, the phase-change material reduces the temperature increase by at least 10° C., typically by at least 20° C. and often at least 30° C. in vessels during a fast-fill process compared to a similar vessel that does not have the phase-change material.

Another aspect of the invention provides a device comprising a vessel capable of storing gas under pressure within an internal chamber. The internal chamber's surface comprises a phase-change material such that the presence of the phase-change material reduces the temperature change within the internal chamber during the compression of the gas. In some embodiments, the internal chamber comprises a bladder-type compartment that stores gas under pressure.

DETAILED DESCRIPTION OF THE INVENTION

Under the current industry standard conditions, some natural gas vehicle (NGV) tanks are designed to hold about 20 gasoline gallon equivalents (GGE) of compressed natural gas for fuel. Unfortunately, during a gas-filling process on relatively hot days, the gas will expand and the vessel may only fill to around 75% of its rated GGE capacity at the rated vessel pressure. In fact, the amount of compressed natural gas (CNG) that can be stored on-board varies based on many factors including the pressure rating of the fuel storage system, the ambient temperature, and the fueling rate.

Fueling is an overflow process from the storage vessel (high volume with a high pressure level) into the vehicle's fuel storage vessel (low volume and low initial pressure). Typical CNG fast-filling stations are generally best suited for retail situations where light-duty vehicles, such as vans, pickups, and sedans, arrive randomly and need to fill up quickly. Gas from the distribution pipeline, usually at "low" pressure (e.g., <60 psi) or possibly at "medium" pressure (e.g., around 230 psi), is compressed using a large multi-stage compressor into a "cascade" storage system. This system is maintained at a pressure higher than that in the vehicle's on-board storage so that gas flows to the vehicle's fuel storage vessel under differential pressure. Typically, the cascade storage allows filling a vessel in the range of 3,000 psi to 4,350 psi.

Figure 3:
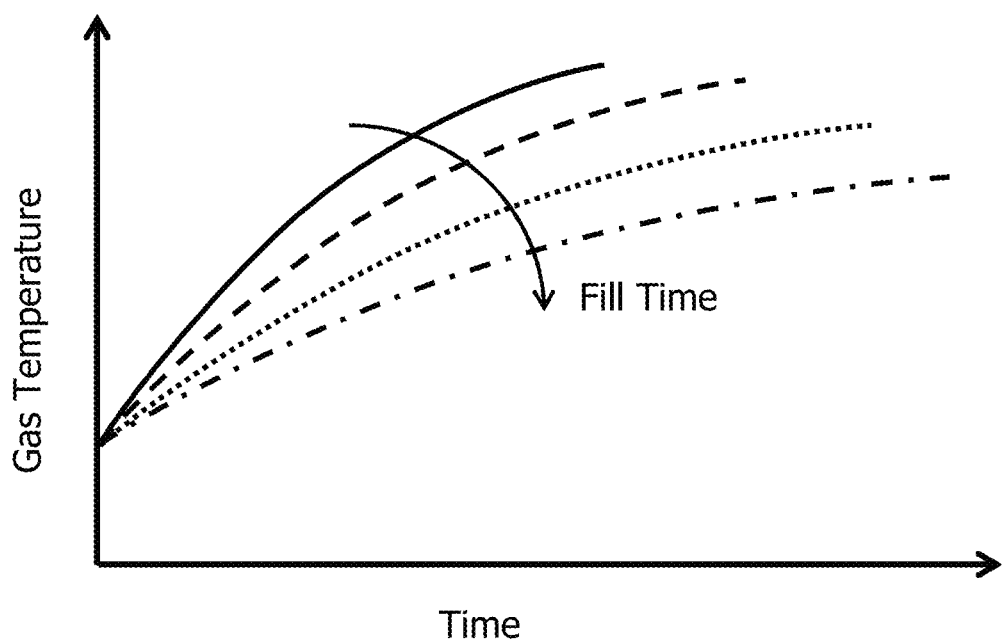
FIG. 3 is a representative graph of the gas temperature vs. time for various fill rates.
Figure 4:
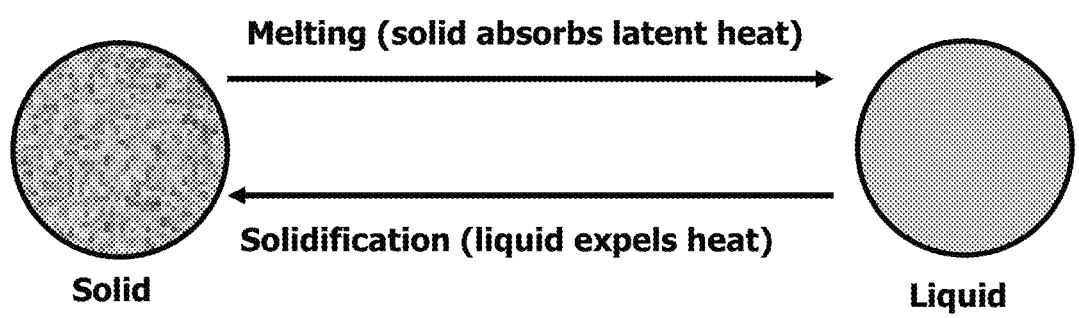
FIG. 4 is a schematic representation of the phase change process.

During the filling, fuel storage vessels encounter a rise in temperature as a function of ambient temperature, vessel size and speed of fill. See FIG. 3. A fast fill is defined as filling a gas storage vessel (e.g., a cylinder) in 10 minutes or less and often 5 minutes or less. Empirical evidence suggests that the gas temperature can rise 30 to 40° C. during a fast-fill process. Faster filling results in significant heating of the gas in the vessel, thereby increasing internal gas pressure, often resulting in under filling. In addition to CNG, the temperature rise during fast filling of a vessel with gaseous hydrogen has also been tested and verified with analytical models by several researchers.

The problem of under-filling during a fast-fill process due to rise in temperature within the vessel is a general problem that exists in virtually all applications that utilize gas including in aerospace, medical, industrial, automotive, oil and gas, and many sports applications. The filling gas, i.e., gas used to fill a vessel, includes, but is not limited to, CNG, propane, hydrogen, helium, oxygen, carbon-dioxide, nitrous-oxide, argon, xenon, neon, Argon, acetylene, nitrogen, air, chlorine, fluorine and such. However, it should be appreciated that the scope of the invention is not limited to any particular gas. The scope of the invention encompasses all gases that are stored in a gas storage device regardless of its application.

As discussed above, in many instances, undercharging of gas is a result of temperature increase within the gas storage vessel during the filling process. Without being bound by any theory, it is believed that such an increase in the temperature occurs due to several factors including conversion of enthalpy of the stored gas in the high pressure storage vessel to internal energy in the vehicle's fuel storage vessel and compression of the gas during the filling process. In general, a faster fill process results in a higher temperature increase. As used herein, unless the context requires otherwise, the term "temperature increase" when referring to a gas fill process refers to the increase in the temperature within the interior space and the inner surface of the gas storage device relative to its temperature at the beginning of the gas fill process. Temperature increase within the gas storage vessel during a fast-fill process is a widespread problem that is well defined in thermodynamic literature. For example, it has been shown that in CNG applications, fast filling can result in under-filling by as much as 20% and in hydrogen by as much as 30%. For a vessel that is rated to a specific pressure, the consumer either has to sacrifice time (e.g., by slowing the charging rate) or sacrifice range (e.g., distance or usage until next required refuel). The resulting reduced driving range of a gas-powered vehicle is a serious obstacle that the gas industry is striving to overcome without resorting to unnecessarily high fueling station pressures or by applying extensive over-pressurization during the fueling operation. Consequently, the on-board storage capacity of vehicles using pressurized gas as fuel, such as natural gas (CNG) or gaseous hydrogen, is a major obstacle to the wide spread adoption of these alternative fuel vehicles.

Currently, the design or regulatory standards for CNG vessels for service pressure is either 3,000 psi or 3,600 psi depending on the type of gas-fueled vehicles being served. These standards allow for overfilling, which takes into account for the increased temperature generated during fast filling, and therefore use the overfilled condition as the upper limit in the pressure cycle tests. For example, a maximum pressure of 4,500 psi is permitted in the ANSI NGV-2 2007 standard for a vessel with 3,600 psi service pressure, regardless of ambient temperature. This allowance for the maximum pressure necessitates gas storage systems with higher safety margins and lower life cycle resulting in a higher overall cost and weight to the gas storage systems.

The type of material used in a gas storage vessel can also influence the temperature increase during the fast-fill process. For example, the difference in temperature increase at different rates of pressure increase can be relatively small in a Type 3 (metal lined) composite overwrapped pressure vessel, but the temperature increase in a Type 4 (polymer lined) composite overwrapped pressure vessel becomes significantly higher at higher rates of pressure increase. It is believed that this difference in the rate of temperature increase is due to the coefficients of thermal diffusivity and thermal conductivity of aluminum being significantly larger than those of a thermoplastic polymer in the liner of Type 4 vessels.

The invention alleviates inter alia the problem of under-filling by incorporating a layer of phase change material in between the metal liner and the composite overwrap. In one particular embodiment, the CPM is present on the "exterior" surface of the metallic liner in a gas storage device, thereby significantly reducing the temperature increase during a gas filling process rather than simply relying on over-pressurizing the vessel. As used herein, the term "exterior surface" when referring to the metal liner, means the surface of the metal liner that exterior to the gas storage area. Typically, under the standard temperature and pressure conditions (i.e., 20° C. at 1 atmospheric pressure), the presence of the PCM on the surface of the metal liner reduces the temperature increase during a fast filling process of CNG by at least 10° C., often by at least 15° C., and more often by at least 20° C.

In some embodiments, for a 20 gasoline gallon equivalent gas storage device for a natural gas vehicle (i.e., NGV), the amount of additional natural gas that can be filled in the gas storage device of the invention is at least 5%, typically at least 10%, and often at least 15% more than a similar gas storage device in the absence of the PCM coating. The term "similar" or the "same" when referring to a gas storage device refers to a gas storage device comprised of the same material and specifications (e.g., volume, size, capacity, orifice diameter, etc.) as the gas storage device of the invention except that no PCM is present in the gas storage device.

As used herein, the term "fast-filling process" refers to filling a gas storage device (e.g., 20 gasoline gallon equivalent gas storage devices of a natural gas vehicle, i.e., NGV) within 10 minutes or less and typically within 5 minutes or less. It should be appreciated that as the gas storage device becomes filled with gas, its rate of filling will decrease.

The gas storage device of the invention is designed inter alia to absorb heat energy that is generated during a gas filling process by utilizing a phase-change material (PCM). The use of PCM reduces the temperature increase in the gas and minimizes or eliminates reduction of the gas density during a gas-fill process. Without being bound by any theory, it is believed that the PCM reduces the temperature increase during the gas filling process by absorbing the excess thermal energy. The process of heat energy absorption by PCM is transparent to the filling process and the operation of the filling station. By allowing the phase-change materials to participate in a heat transfer mechanism during compression at near-isothermal conditions, the energy required to compress the same amount of gas to the same final, cooled state decreases. The reduction in work done on the gas improves the efficiency of the gas compression or expansion process and enables more efficient energy storage through gas compression.

The presence of a phase-change material reduces the temperature change within the interior of the vessel or the device during a gas filling process. Typically, the phase-change material reduces the amount of temperature increase significantly compared to a similar gas storage vessel that does not have the phase-change material but is otherwise made of the same material and has the same physical dimensions. Typically, the PCM comprises a material that melts (i.e., changes phase) from solid to liquid at a certain temperature. Exemplary PCMs that can be used in the invention include, but are not limited to, PCMs that have a melting point in the range from about 0° C. to about 80° C., typically from about 20° C. to about 50° C.

Another aspect of the invention provides a method for incorporating the phase-change material in a metal-lined (e.g., Type 3) composite composite overwrapped pressure vessel. The vessel includes a metallic liner with an orifice that can be used to fill the vessel with gas. In a Type 3 pressure vessel used for storing CNG or H2, the metallic liner is most commonly aluminum. The liner can be formed by forging or spin-forming process where a seamless extruded tube is spun and incrementally deformed by a roller head. Subsequent to the formation of the liner, it is heat treated and requisite ports are machined to construct the orifice. The liner is then overwrapped with multiple layers of composite material using methods such as filament winding. The composite material is cured in an oven to vitrify the composite material which then provides the structural shell for the vessel and allows for storage of gas under high pressure.

Generally, any metal or metal alloy can be used as a liner. Thus, the terms "metal liner" and "metallic liner" are used interchangeably herein and refer to a metal or a metal alloy that is used to store compressed gas. For the sake of brevity, unless the context requires otherwise, the term "metal" includes a metal alloy. Exemplary metals and metal alloys that are useful as metal liner of the invention include, but are not limited to, aluminum, copper, copper-zinc alloy (i.e., brass), tin-copper alloy (i.e., bronze), as well as other metals and metal alloys comprising iron, tin, copper, zinc, gold, silver, platinum, nickel, etc.

Since one of the goals of the invention is reducing the temperature increase during a fast gas-filling process, it is desirable to have a metal that has a relatively high thermal conductivity. Having a relatively high thermal conductivity of metal liner allows faster heat transfer to the PCM, thereby reducing the temperature increase at a faster rate. Typically, the metal liner has thermal conductivity of at least 60 watts per meter kelvin (W/(m·K)), often at least 90 W/(m·K), and more often at least 120 W/(m·K), at temperature of 25° C. For example, the thermal conductivity of aluminum is 205 W/(m·K) at 25° C. whereas the thermal conductivity of cast iron at the same temperature is only 55 W/(m·K). Because of its high thermal conductivity, aluminum is capable of efficient heat absorption and heat transfer from the inside of the vessel during the fast-fill to the phase-change material. In one particular embodiment, the metal liner comprises aluminum.

In a typical process for fabricating the gas storage device of the invention, before the metal liner is overwrapped with a composite material, the exterior surface of metal liner is coated with a layer comprising a phase-change material. The PCM coating on the exterior surface of the metal liner can also act as a corrosion barrier between the metal liner and the composite overwrap if a galvanic potential exists between the two.

Figure 2A:
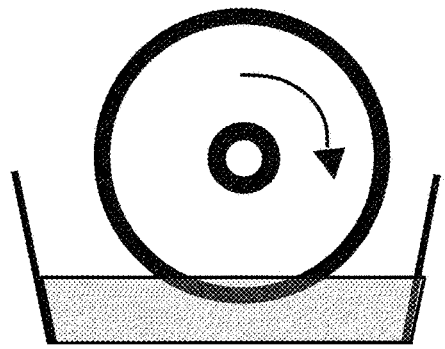
FIGS. 2A-2C illustrates various methods for incorporating a PCM material on the exterior surface of the metallic liner.
Figure 2B:
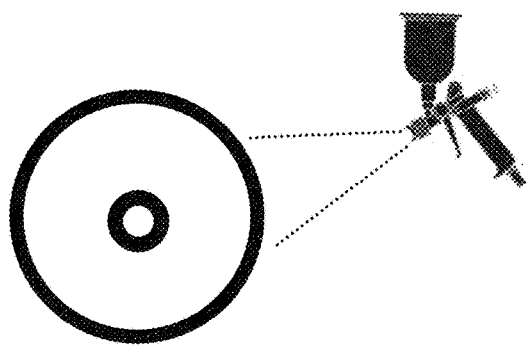
Figure 2C:
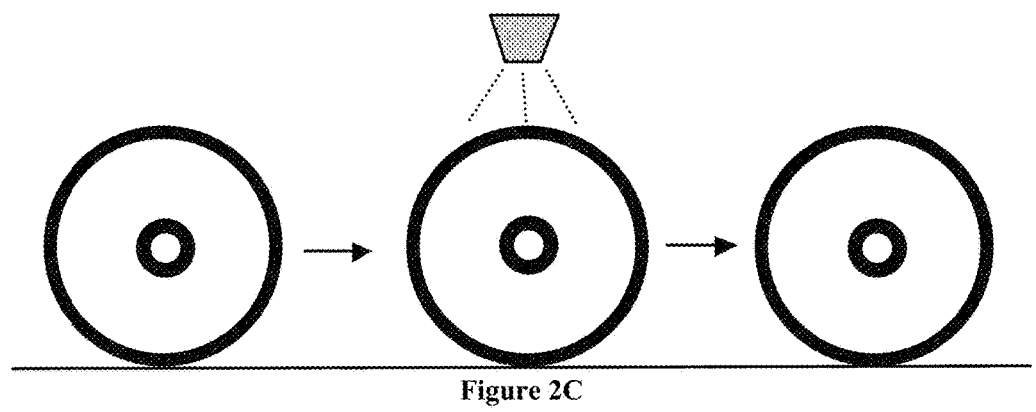

The coating of PCM on to the exterior surface of the metal liner can be applied by any process known to one skilled in the art including, but not limited to, roll-in-bath coating (e.g., FIG. 2A); hand coating; spray coating (e.g., FIG. 2B); dip coating; powder coating (e.g., FIG. 2C); drip-coating; vapor deposition; chemical deposition; filament winding a layer with fibers impregnated with resin incorporating the PCM; or a combination thereof. The PCM can be applied to the metal liner as part of a paint, a fiber that incorporate PCM within the fiber structure, and/or a film or sheet-style wrapper comprising the PCM.

The thickness and the characteristics of the coating are designed to match the chemical and thermal characteristics of the metal liner. In addition, the thickness of the coating and the amount of PCM material in the coating can be pre-calculated to provide the optimum absorption of heat during the fast-fill process, thereby providing increased fill of the gaseous content. The chemical characteristics of the coating that comprises PCM can also be selected to comply with the cure characteristics of the composite overwrap.

In another embodiment, the thermal characteristic of the coating that incorporates the PCM material can be manipulated to improve the heat transfer characteristics during the fast fill process. This can be achieved by use of fillers, fibers, micro-particles and/or nano-materials in the coating to enhance the thermal conductivity of the coating.

In one particular embodiment, PCM is incorporated on the outer or the exterior surface of the metallic liner for Type 3 pressure vessels to allow thermal management during fast-fill of gaseous fuels. The coating facilitates heat absorption during the fast-fill process. In addition, the coating can also acts as a barrier against galvanic corrosion between aluminum and the composite material. The metallic liner provides conductive heat transfer of the latent heat absorbed by the PCM during the fast fill process, enabling further increase in the efficiency of the temperature control and the filling process.

In another embodiment, the exterior surface of the metallic liner of the pressure vessel is coated with a paint that incorporates the PCM. The paint can be of any type including but not limited to acrylic, polyurethane, latex, epoxy, or alkyl type of paints.

Still in another embodiment, the metallic liner is coated with the PCM-incorporated paint layer by rotating it while submersing the outside surface of the metal liner in a bath of the paint.

Yet in another embodiment, the exterior surface of the metallic liner of the pressure vessel is applied with a spray coating that incorporates the PCM.

In another embodiment the metallic liners are transported through a dripping or drizzling shower of PCM-incorporated paint or solution to facilitate uniform coating of the liners as part of the continuous manufacturing line.

Yet still in another embodiment, the exterior surface of the metallic liner of the pressure vessel is powder coated with paint that incorporates the PCM.

In another embodiment, the metallic liner of the pressure vessel is wrapped with a dry film that comprises a PCM.

The metallic liner of the pressure vessel can also be overwrapped with a fabric that is impregnated in resin that incorporates PCM.

The metallic liner of the pressure vessel can also be filament wound with fibers impregnated in resin that incorporates PCM.

PCMs have been incorporated in garments and linings for garments to provide the benefit of proactive temperature regulation by managing body heat and moisture. PCMs have also been used as thermal interface materials (TIMs) and/or thermal greases/pads to enhance heat management and heat transfer between two electronic interfaces. Such TIMs have excellent wetting at interfaces during typical operating temperature range, resulting in very low surface contact resistance. PCMs have also been incorporated in thermal energy storage (TES) devices in power grids as well as in building architecture. TES is typically used for a temporary storage of thermal energy for later use and essentially bridges the time gap between energy requirement and energy use. Thermal energy storage systems provide the potential to attain energy savings, which in turn reduce the environment impact related to energy use. PCMs have also been used in beverage receptacles including coffee mugs to keep the beverage at a desired temperature for an extended period of time.

Thermochemical systems rely on the energy absorbed and released in breaking and reforming molecular bonds in a reversible chemical reaction. In this case, the heat stored depends on the amount of storage material, the endothermic heat of reaction, and the extent of conversion. Amongst thermal heat storage techniques, latent heat thermal energy storage is particularly attractive due to its ability to provide high energy-storage density and its characteristics to store heat at constant temperature corresponding to the phase transition temperature of phase change material. Phase change can be in the following form: solid-solid, solid-liquid, solid-gas, liquid-gas and vice versa.

PCMs are "Latent" heat storage materials. The thermal energy transfer occurs when a material changes from solid to liquid, or liquid to solid. This is called a change in state, or "Phase." Compared to the storage of sensible heat, there is no significant temperature change during the phase change. Initially, these solid-liquid PCMs perform like conventional storage materials; their temperature rises as they absorb heat. Unlike conventional (sensible) storage materials, PCMs absorb and release heat at a nearly constant temperature. PCMs can store 5 to 14 times more heat per unit volume than sensible storage materials such as water, masonry or rock. A large number of PCMs are known to melt with a heat of fusion in any required range. However, for their employment as latent heat storage materials these materials should exhibit certain desirable thermodynamic, kinetic and chemical properties. Moreover, economy and availability of these materials should also be considered.

One of the factors in selecting a particular PCM for a given application include matching the transition temperature of the PCM for the given application. In addition, the operating temperature of heating or cooling should be matched to the transition temperature of the PCM. The latent heat should be as great as possible, especially on a volumetric basis, to minimize the physical size of the PCM required to store the heat. High thermal conductivity assists the charging and discharging of the energy storage.

Exemplary PCMs that are suitable for the invention include, but not limited to, organic materials such as paraffin and fatty acids, salt hydrates, water, eutectics, naturally occurring hygroscopic materials, metals and metallic particles, nano-materials. Some of the particular PCMs suitable for the invention include, but are not limited to, heptanone-4®, n-Unedane®, TEA_16®, ethylene glycol, n-dodecane, Thermasorb 43®, Thermasorb 65®, Thermasorb 175+®, Thermasorb 215+®, sodium hydrogen phosphate, Micronal®, and an assortment of other polymeric PCMs.

The vessel or the device of the invention also includes an orifice 10 (FIG. 1A) that is adapted to be used to fill the vessel with gas. Orifice 10 can also be used as an outlet port of the gas within the vessel. The vessel can optionally include an additional orifice or orifices that can be used as a gas outlet such that the inlet and the outlet of gas are separate. The device can also include additional elements such as a gauge to measure the internal pressure of the vessel or a polar boss 20 (FIG. 1B) that can be configured to attach various elements to the device, such as a gauge, regulator, etc.

Figure 1A:
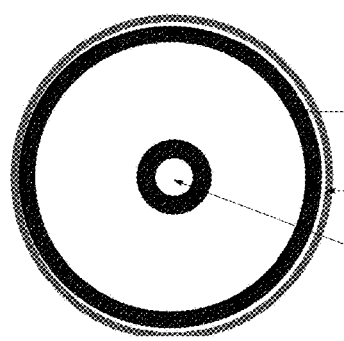
FIG. 1A is a schematic illustration of a top view of one particular embodiment of the invention.
Figure 1B:
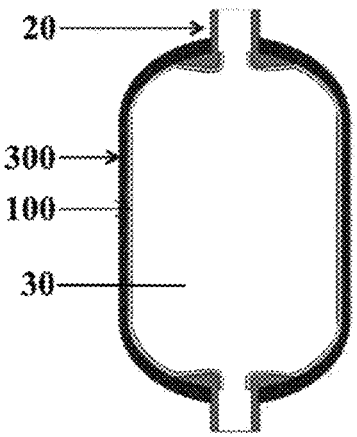
FIG. 1B is a cross-sectional schematic illustration of another embodiment of the invention.

As shown in FIGS. 1A and 1B, the gas storage device includes a metal liner 100, a PCM coating 200 on the exterior surface of metal liner 100, and a composite material 300 that encapsulates substantially all of the exterior surface of said phase-change material coated metallic-liner 100. When the interior area 30 of the metal liner 100 is filled with gas during a fast fill process, the heat generated therein is transferred to the metal liner 100. By using a high thermal conductive metal for metal liner 100, the temperature increase quickly dissipates to metal liner 100. When no PCM is present, the transfer of heat between metal liner 100 and composite material 300 is slow and limited. By adding a coating of PCM material 200, the heat that is absorbed by metal liner 100 is quickly dissipated through the action of the PCM resulting in a significantly reduced temperature increase during a fast-fill process.

Figure 5:
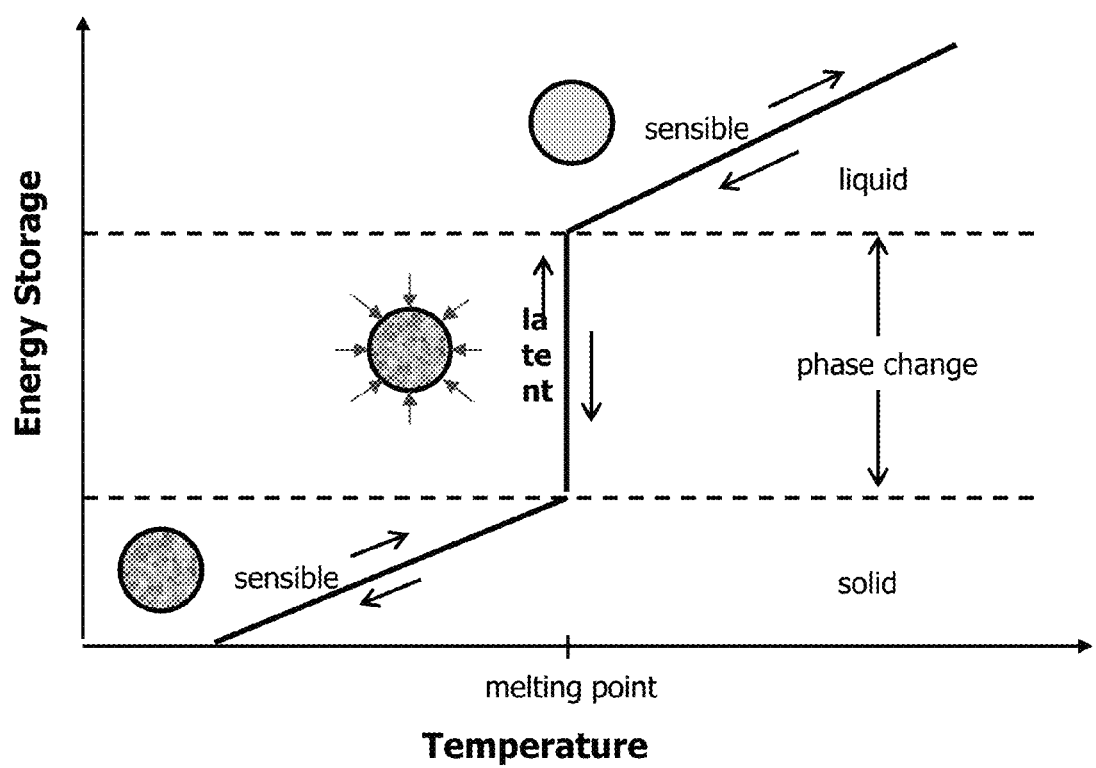
FIG. 5 is a typical thermal cycle graph of a Phase Change Material.

In some embodiments, the PCM is microencapsulated. Micro-encapsulation enables handling of the PCMs independently of being solid or liquid. The microencapsulation involves forming tiny particles of solid, liquid or gas that surround the PCM core material with a relatively hard polymeric shell. The coated, i.e., microencapsulated, particles can then be incorporated in any matrix, such as thermoplastics, paints, or elastomers, that is compatible with the encapsulating film. When subjected to a thermal flux, thermoplastics or elastomers with embedded microencapsulated PCMs exhibit a thermal cycle that is schematically illustrated in FIG. 5.

Exemplary thermoplastics that are useful in the invention include, but are not limited to, polyethylene (PE), cross-linked polyethylene (XLPE), polyvinyl chloride (PVC), liquid crystal polymer (LCP), and fluoroplastics (PTFE) etc. Thermoplastics are typically used as a constituent of the composite material applied to the pressure vessel of the invention. These composite materials can be formed by any of the manufacturing processes known to one skilled in the art, such as rotomolding, injection molding, spin forming or resin transfer molding. In some embodiments, the PCM material is embedded in the thermoplastic material during the manufacturing process of the composite material in a pre-determined stoichiometric ratio. This incorporation of PCM within the thermoplastic composite material allows simultaneous incorporation of PCM and the composite material.

The presence of PCM on the exterior surface of the vessel of the device reduces the temperature increase within the interior of the vessel during a gas filling process compared to the similar vessel in the absence of PCM. As used herein, the term "similar vessel" refers to a vessel that is identical in composition and dimension as that of the vessel of the invention except for the presence of PCM. During filling of the vessel with a gaseous fuel, the metal liner absorbs the thermal energy, and transfers the thermal energy to the PCM, thereby substantially reducing the temperature increase within the vessel during pressurization or filling process. This absorption of thermal energy by PCM increases the amount of gas filled during the fill process and reducing the severity of under-filling compared to a similar vessel that does not have PCM. For example, the device of the invention at standard temperature and pressure (i.e., 1 atmospheric pressure at 20° C.) can be filled using a fast-fill process with at least 5% more, typically at least 10% more, and often at least 15% more gas than a similar device that does not have PCM.

Figure 6:
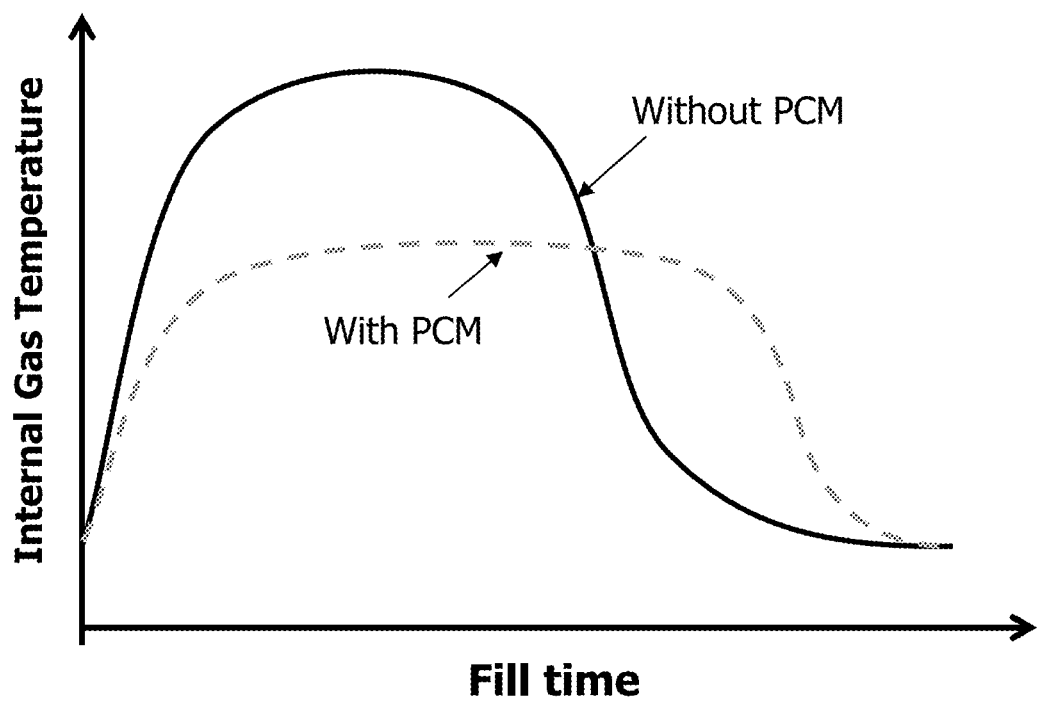
FIG. 6 is a comparative graph of temperature vs. fill time in a gas storage vessel with and without PCM during a fast-fill process.

As graphically illustrated in FIG. 6, during the fast-fill process the temperature of the gas increases steadily, reaches a plateau and then dissipates during the post-fill period. In the vessel without PCM, the release of heat energy during the post-fill period is facilitated by thermal sinks such as metallic liner, metallic polar boss and/or metallic valves and regulators attached to the pressure vessel. In contrast, a vessel that incorporates a PCM absorbs thermal energy generated during the fill-process, and uses the thermal energy to convert the PCM from, for example, solid to liquid phase. This allows the plateau temperature experienced by the gas to be significantly lower in the presence of the PCM. The latent heat is dissipated slowly as the PCM material re-solidifies in the post-fill period. This results in a slower ramp down from the plateau temperature during the post-fill process compared to a vessel with a traditional liner.

At present, the primary packaging options for gaseous transportation and storage applications include pressure vessels of Type 1, Type 2, Type 3 and Type 4. One of the key differentiators for each vessel type is its load-bearing element and associated material, whether a monolithic metallic pressure vessel, or a combination of metal or non-metallic liner and external wrap. Methods disclosed herein can be adapted to any one of the currently known pressure vessels as well as other pressure vessels that become available in which a metal liner is used.

Without being bound by any theory, thermodynamically speaking, the amount of gas filled during the fast-fill process depends strongly on the peak temperature for a given maximum filling pressure. Since the plateau temperature, i.e., the amount of temperature increase (see FIG. 6), experienced by a vessel with PCM on the surface of the metal liner is lower than that in a traditional vessel without PCM, resulting in an increased mass of stored gas due to the device of the invention.

As stated above, the incorporation of PCMs on the exterior surface of the vessel, enables a higher volume of gas to be filled during a gas-filling process, particularly during a fast-fill process at a given pressure. For a CNG vessel designed for 3,600 psi working pressure, the mass of gas filled is at least 5% higher, typically at least 10%, higher, often at least 15% higher, and most often in the range of 15 to 25% higher, than what is currently achieved during a fast-fill process without the PCMs. For a $H_2$ vessel designed for 10,000 psi working pressure, the increased gas content is at least 10% higher, typically at least 15% higher, often at least 20% higher, and most often in the range of 20 to 40% higher, than what is currently achieved during a fast-fill process without the PCMs. For other gases, the mass of filled gas during a fast-fill process is at least 5% higher, typically at least 10% higher, and often typically in the range of 10 to 30% higher, than what is currently achieved without the PCMs.

Another embodiment of the invention provides a container or receptacle that comprises PCM within its outer surface. Such a container or receptacle can be used to store compressible gas for any industrial, automotive, medical, aerospace, sports or oil and gas application.

The foregoing discussion of the invention has been presented for purposes of illustration and description. The foregoing is not intended to limit the invention to the form or forms disclosed herein. Although the description of the invention has included descriptions of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A metal-lined composite gas storage device configured for storing a gas under high pressure, said metal-lined composite gas storage device comprising:
   a metallic liner;
   a phase-change material coated on the exterior surface of said metallic liner; and
   a composite material encapsulating substantially all of the exterior surface of said phase-change material coated metallic-liner, wherein the presence of said phase-change material reduces the temperature change within the interior of said metallic liner during a gas filling process.

2. The metal-lined composite gas storage device of claim 1, wherein said phase-change material is microencapsulated.

3. The metal-lined composite gas storage device of claim 1, wherein the presence of said phase-change material increases the amount of gas filled during a fast gas filling process by at least 10% compared to a similar metal-lined composite gas storage device without said phase-change material.

4. The metal-lined composite gas storage device of claim 1, wherein said metallic liner comprises a high thermal conductive metal.

5. The metal-lined composite gas storage device of claim 1, wherein said metallic liner is fabricated from a metal or a metal alloy.

6. The metal-lined composite gas storage device of claim 1, wherein said metallic liner comprises aluminum, aluminum alloy, copper, copper-zinc alloy, tin-copper alloy, as well as alloys comprising iron, tin, copper, zinc, gold, silver, platinum, nickel, or a combination thereof.

7. The metal-lined composite gas storage device of claim 1, wherein the melting point temperature of said phase-change material is in the range from about 0° C. to about 80° C.

8. The metal-lined composite gas storage device of claim 1 further comprising a pressurized gas within the interior of said metallic-liner, wherein the pressure of said gas is at least 3,000 psi.

9. The metal-lined composite gas storage device of claim 8, wherein said gas is selected from the group consisting of hydrogen, natural gas, CNG, propane, helium, oxygen, carbon-dioxide, nitrous-oxide, argon, xenon, neon, acetylene, propylene, nitrogen, air, chlorine, and fluorine.

10. A method for producing a metal-lined composite gas storage device of claim 1, said method comprising:
coating the exterior surface of the metallic-liner with the phase-change material to produce a PCM coated metallic-liner; and
encapsulating said PCM coated metallic-liner with the composite material to produce the metal-lined composite gas storage device.

11. The method of claim 10, wherein said phase-change material is coated on to the metallic-liner by roll-in-bath coating, hand painting, spray painting, dip coating, powder coating, drip-coating, vapor deposition, chemical deposition, filament winding a layer of fibers comprising the phase-changing material, or a combination thereof.

12. The method of claim 10, wherein said step of encapsulating said PCM coated metallic-liner with the composite material comprises overwrapping said PCM coated metallic-liner with a filament of the composite material to produce a filament wrapped gas storage device; and curing said filament wrapped gas storage device under conditions to produce said metal-lined composite gas storage device.

13. A method for increasing the amount of gas filled in a metal-lined composite gas storage device during a gas filling process, said method comprising placing a sufficient amount of phase-change material between a metallic-liner and the composite material encapsulating said metallic-liner such that the presence of said phase-change material between said metallic-liner and said composite material substantially reduces a temperature increase during the gas filling process thereby allowing said metal-lined composite gas storage device to be filled with a higher amount of gas during the gas filling process compared to a similar metal-lined composite gas storage device in the absence of said phase-change material.

14. The method of claim 13, wherein the exterior surface of said metallic-liner is coated with said phase-change material.

15. The method of claim 13, wherein said phase-change material reduces the temperature increase by at least 10° C. during a fast-fill process compared to a similar vessel in the absence of said phase-change material.

16. The method of claim 13, wherein said gas is selected from the group consisting of hydrogen, natural gas, CNG, propane, helium, oxygen, carbon-dioxide, nitrous-oxide, argon, xenon, neon, acetylene, propylene, nitrogen, air, chlorine, and fluorine.

17. The method of claim 13, wherein at least 5% of additional amount of gas is filled under similar gas filling conditions in the presence of said phase-change material in said metal-lined composite gas storage device compared to a similar metal-lined composite gas storage device in the absence of said phase-change material.

* * * * *